(12) United States Patent
Meijer et al.

(10) Patent No.: US 10,571,066 B2
(45) Date of Patent: Feb. 25, 2020

(54) CLADDING TUBE FOR ENVELOPING AN UNDERWATER CONDUIT

(71) Applicant: LANKHORST ENGINEERED PRODUCTS B.V., Sneek (NL)

(72) Inventors: Karst Meijer, Leeuwarden (NL); Arnoldus Van Belkom, Spannum (NL); Ruud Jesse Fieten, Ijhorst (NL)

(73) Assignee: LANKHORST ENGINEERED PRODUCTS B.V., Sneek (NL)

( * ) Notice: Subject to any disclaimer, the term of this patent is extended or adjusted under 35 U.S.C. 154(b) by 192 days.

(21) Appl. No.: 15/526,401

(22) PCT Filed: Nov. 17, 2015

(86) PCT No.: PCT/NL2015/050802
§ 371 (c)(1),
(2) Date: May 12, 2017

(87) PCT Pub. No.: WO2016/080827
PCT Pub. Date: May 26, 2016

(65) Prior Publication Data
US 2017/0328509 A1 Nov. 16, 2017

(30) Foreign Application Priority Data

Nov. 17, 2014 (NL) ..................................... 2013819

(51) Int. Cl.
*F16L 57/00* (2006.01)
*F16L 57/02* (2006.01)
(Continued)

(52) U.S. Cl.
CPC .............. *F16L 57/02* (2013.01); *F16L 1/123* (2013.01); *H02G 1/10* (2013.01); *H02G 9/065* (2013.01)

(58) Field of Classification Search
CPC ........... F16L 57/02; F16L 1/123; H02G 9/065
(Continued)

(56) References Cited

U.S. PATENT DOCUMENTS 3,529,664 A * 9/1970 Baker .................... F16L 33/006
138/155
3,628,572 A * 12/1971 Shannon .................. B29C 63/22
138/149

(Continued)

FOREIGN PATENT DOCUMENTS

EP 2096729 A1 9/2009
GB 2089140 A 6/1982
(Continued)

*Primary Examiner* — James F Hook
(74) *Attorney, Agent, or Firm* — Pearne & Gordon LLP (57) ABSTRACT

A cladding tube (1) for enveloping an underwater conduit (2), such as a pipeline or a cable line, has at least one clamping portion (6), which comprises at least one deformation portion (6A, 6B, 6C) being integrally manufactured with the cladding tube (1), which deformation portion (6A, 6B, 6C) is a first wall portion of the cladding tube (1), which has a larger thickness in the radial direction than at least one second wall portion (8) of the clamping portion concerned, in such manner that by the larger thickness the first wall portion is, and the at least one second wall portion (8) is not, pressed against the underwater conduit (2) by a tensioning strap (7) being tensioned all round. The deformation portion concerned is easy to produce, durable and reliable. Thanks to the at least one clamping portion the cladding tube can be designed in harder and lower-cost materials than the soft, flexible poly urethane, which is usually applied nowadays.

26 Claims, 8 Drawing Sheets

(51) Int. Cl.
    *H02G 1/10* (2006.01)
    *H02G 9/06* (2006.01)
    *F16L 1/12* (2006.01)

(58) Field of Classification Search
    USPC ............. 138/119, 120, 110, 155, 161, 162
    See application file for complete search history.

(56) References Cited

U.S. PATENT DOCUMENTS

| | | | | |
|---|---|---|---|---|
| 4,415,764 | A | 11/1983 | Priaroggia et al. | |
| 4,889,167 | A * | 12/1989 | Morris | F16L 55/172 |
| | | | | 138/99 |
| 5,330,378 | A * | 7/1994 | Park | B63B 21/20 |
| | | | | 114/267 |
| 5,490,742 | A * | 2/1996 | Cronk | F16L 57/00 |
| | | | | 138/110 |
| 6,039,081 | A | 3/2000 | Albert | |
| 6,270,387 | B1 * | 8/2001 | Nesheim | E21B 17/012 |
| | | | | 441/133 |
| 6,408,888 | B1 * | 6/2002 | Baumer | F16G 13/16 |
| | | | | 138/120 |
| 6,761,189 | B2 * | 7/2004 | Berninger | B25J 19/0025 |
| | | | | 138/104 |
| 7,100,641 | B2 * | 9/2006 | Tyrer | F16L 1/123 |
| | | | | 138/110 |
| 7,168,452 | B2 * | 1/2007 | Sasaki | F16L 53/35 |
| | | | | 138/110 |
| 9,033,614 | B2 * | 5/2015 | Yuan | F16L 1/24 |
| | | | | 405/169 |
| 9,140,385 | B2 | 9/2015 | Meijer | |
| 2004/0013473 | A1 * | 1/2004 | Gibson | E21B 17/01 |
| | | | | 405/211 |
| 2007/0051417 | A1 * | 3/2007 | Boettner | F16L 11/15 |
| | | | | 138/121 |
| 2008/0217056 | A1 * | 9/2008 | Howard | H02G 9/065 |
| | | | | 174/88 S |
| 2010/0101677 | A1 * | 4/2010 | Liebel | F16L 21/06 |
| | | | | 138/158 |
| 2013/0330131 | A1 | 12/2013 | Meijer | |
| 2014/0377010 | A1 | 12/2014 | van Belkom | |
| 2015/0354730 | A1 * | 12/2015 | Plunkett | H02G 3/0462 |
| | | | | 138/155 |
| 2017/0159373 | A1 * | 6/2017 | Duggan | F16L 1/123 |

FOREIGN PATENT DOCUMENTS

| | | |
|---|---|---|
| GB | 2260590 A | 4/1993 |
| WO | 983563 A1 | 8/1998 |
| WO | 2012081976 A1 | 6/2012 |
| WO | 2013105853 A1 | 7/2013 |

\* cited by examiner

CLADDING TUBE FOR ENVELOPING AN UNDERWATER CONDUIT

The invention relates to a cladding tube for enveloping an underwater conduit, such as a pipeline or a cable line, wherein the cladding tube has an operation condition, in which the cladding tube is installed around said underwater conduit.

Such cladding tubes are particularly applied in off-shore maritime installations. Therein, usually the cladding tubes mainly serve to protect underwater conduits against impacts and damage as a result of collisions. Also the cladding tubes can have provisions for suppressing vortex-induced vibrations, such as fin-shaped protrusions.

In view of said protection against impacts and damage, in present practice such cladding tubes are mainly designed in a soft/flexible polyurethane (PU), with a wall thickness being tuned to the specific application concerned. Therein, usually separate (half-)shell parts are mutually interconnected in the circumferential direction of the underwater conduit. Tensioning straps, installed all around, are keeping the soft shell parts together. Apart from the good protection against impacts and damage, the soft polyurethane additionally provides the advantage that thereby bends in the underwater conduit can be followed well.

A drawback of these known cladding tubes is, that they are relatively expensive to apply. That is, not only the soft polyurethane is relatively expensive, but also the tensioning straps are expensive, because the tensioning straps are made in expensive metal types in view of the necessary durability. Since usually large wall thicknesses of the cladding tubes are necessary to cope with the impacts, and since the number of tensioning straps per unit of length in longitudinal direction of the underwater conduits has to be relatively large to keep the flexible shell parts together, the total costs of these known cladding tubes are increasing enormously in many applications, especially also since the underwater conduits to be protected are usually extending along very large lengths.

It is an object of the invention to provide at least an alternative solution for reliably enveloping underwater conduits by cladding tubes.

For that purpose, the invention provides a cladding tube according to appended independent claim 1. Specific embodiments of the invention are set forth in the appended dependent claims 2-14.

Hence, the invention provides a cladding tube for enveloping an underwater conduit, such as a pipeline or a cable line, wherein the cladding tube has an operation condition, in which the cladding tube is installed around said underwater conduit, characterized in that the cladding tube over at least one clamping subrange of its overall-range in its longitudinal direction is formed as at least one clamping portion, respectively, of the cladding tube, which clamping portion comprises at least one local deformation portion, which is integrally manufactured with the cladding tube, and which can deform, relative to other portions of the cladding tube lying adjacent to the deformation portion, under influence of a tensioning strap being tensioned around the clamping portion in circumferential direction of the cladding tube, in such manner that said tensioned tensioning strap presses the at least one deformation portion in said operation condition of the cladding tube with at least a component in radial direction of the cladding tube against the underwater conduit, whereby the cladding tube is locally clamped against the underwater conduit by the at least one deformation portion, wherein at least one of the at least one deformation portion of at least one of the at least one clamping portion is a first wall portion of the cladding tube, which has a larger thickness in the radial direction than at least one second wall portion of the clamping portion concerned in such manner that as a result of said larger thickness the first wall portion is, and the at least one second wall portion is not, pressed against the underwater conduit by said tensioned tensioning strap.

Hence, the cladding tube according to the invention has the at least one clamping portion in the at least one clamping subrange, which clamping portion comprises the at least one deformation portion being integrally manufactured with the cladding tube.

Thanks to the at least one local deformation portion the cladding tube can be designed in various materials which are harder than the abovementioned soft polyurethane.

Hard materials can protect well against collisions. Many hard plastics exist which are considerably cheaper than the abovementioned soft polyurethane. According to the invention, for example a polyethene (PE) can be chosen as a low-cost plastic having a suitable hardness. With a PE, cladding tubes can be manufactured easily and with low costs, for example by a suitable mould in an injection moulding process.

In addition, the application of harder materials provides that connective edges between mutually interconnected separate parts of the cladding already automatically remain better mutually interconnected than in case of the application of the softer polyurethane. Furthermore, harder materials enable more effective means for keeping cladding parts together, such as for example snap-finger interlocking means being manufactured integrally with the cladding parts. For all these reasons, according to the invention, the application of harder materials enables that the number of tensioning straps per unit of length in longitudinal direction of the underwater conduits can be considerably smaller than for the known applications of the soft polyurethane. Thus, the invention provides considerable savings in respect of the costs of the very expensive tensioning straps.

Hence, the invention allows for the application of relatively hard material of the cladding tube in that the hard material is shaped in such manner that there locally occurs an increased flexibility of the cladding tube. According to the invention this in any case finds expression in the shape of the at least one clamping portion in the at least one clamping subrange, which clamping portion comprises the at least one local deformation portion, which is integrally manufactured with the cladding tube.

The said design of the cladding tube according to the invention with the said first wall portion and the said second wall portion makes the deformation portion concerned easy to produce, durable and reliable.

In a preferable embodiment of a cladding tube according to the invention, the two ends of the cladding tube, lying mutually opposite in the longitudinal direction of the cladding tube, are embodied as a male part and a female part, respectively, of a spigot-and-socket joint which can be effectuated between the male part of a first specimen of the cladding tube and the female part of a second specimen of the cladding tube.

Preferably, at least one of the at least one clamping portion is part of said male part in such manner that the clamping portion concerned, in case said spigot-and-socket joint is effectuated, in the circumferential direction of the cladding tube is enveloped by said female part of the spigot-and-socket joint. This provides the advantage that, in the operation conditions of mutually interconnected cladding tubes, the clamping portions and the tensioning straps being mounted around them, are protected against collisions by the female parts of the spigot-and-socket joints.

In a further preferable embodiment of a cladding tube according to the invention, the cladding tube over at least one buckling subrange of its overall-range in its longitudinal direction is formed as at least one peripheral buckling portion, respectively, of the cladding tube, which peripheral buckling portion is extending all round in circumferential direction of the cladding tube and which peripheral buckling portion can buckle in such manner that, as seen in said operation condition, the cladding tube follows a bending course of said underwater conduit, which bending course is occurring in arbitrary directions within said overall-range, by at least one corresponding buckling position of the at least one peripheral buckling portion, respectively.

As mentioned above, the invention allows for the application of relatively hard material of the cladding tube in that the hard material is shaped in such manner that there locally occurs an increased flexibility of the cladding tube. Hence, according to the last mentioned preferable embodiment of the invention, this additionally finds expression in the form of the at least one peripheral buckling portion, where a locally reduced bending stiffness occurs. After all, the at least one peripheral buckling portion makes it possible that bends in the underwater conduits can be followed well by the cladding tube, also if the cladding tube is designed in materials which are harder than the abovementioned soft polyurethane.

The following is noted in respect of the meanings in the present document of "longitudinal direction", "circumferential direction", and "radial direction" of a cladding tube according to the invention. In the present document, these three directions each time have to be interpreted as to be related to a condition being reduced to a "non-buckled condition" of the cladding tube. Herein, said non-buckled condition is understood to mean a condition in which the cladding tube is hypothetically enveloping a straight circular cylinder, more particularly in a manner lying as close as possible against the straight circular cylinder. Herein, a straight circular cylinder is understood to mean a mathematical cylinder having a circular cross-section as seen perpendicularly to a straight centre line of the cylinder. According to the invention, the abovementioned three directions (longitudinal direction, circumferential direction, and radial direction) of a cladding tube are corresponding with the three axes of the mathematically well-known cylindrical coordinate axes system belonging to the abovementioned straight circular cylinder.

It is remarked that the said term "buckling" can be understood to mean: angularly bending as a result of a locally abruptly lower bending stiffness of an object.

In principle, various manners are possible for the realization of the at least one peripheral buckling portion in the at least one buckling subrange. In a further preferable embodiment of a cladding tube according to the invention, at least one of the at least one peripheral buckling portion is formed as at least one peripheral folding pleat, respectively, which is extending all round in circumferential direction of the cladding tube. Such a folding pleat makes the buckling portion concerned easy to produce, durable and reliable.

In a further preferable embodiment of a cladding tube according to the invention, outside of the at least one buckling subrange of the longitudinal direction of the cladding tube, the inner side of the cladding tube, which inner side in said operation condition is facing towards the underwater conduit, is provided with a rib structure. Such a rib structure at the inner side of the cladding tube has the effect that hard impacts onto the outer side of the cladding tube are effectively damped in that the water, which is present between the cladding tube and the underwater conduit, by the rib structure is partly slowed down in flowing away from the place of impact. In fact the water then acts, especially because of the rib structure, as a very effective shock-absorbing medium.

In a further preferable embodiment of a cladding tube according to the invention, the cladding tube comprises a plurality of mutually releasable cladding elements, and wherein said operation condition of the cladding tube requires an assembled condition of said cladding elements, in which assembled condition the cladding elements are connected to one another in the circumferential direction of the cladding tube.

Preferably, the mutually releasable cladding elements are comprising mutually co-operating snap connection elements, respectively, for bringing and maintaining said cladding elements into said assembled condition by snap connection.

In principle, the mutually releasable cladding elements of a cladding tube according to the invention can be differently shaped elements.

Preferably, the mutually releasable cladding elements are mutually identical. In general, this reduces the manufacturing costs of the cladding elements. For example, in case of manufacturing by means of a mould, only one mould shape is required. The application of identical elements also is advantageous in many logistic respects, since in production, transport, storage, installation, etc., of the elements one never has to take into consideration the (proportional) availability of different elements. After all, distinction between different elements is never needed then.

Preferably, the cladding tube is rotational symmetrical in the sense of a rotation of the complete cladding tube about the longitudinal direction of the cladding tube by an angle of rotation, which is equal to 360 degrees divided by the total number of the mutually identical cladding elements of the cladding tube.

In a further preferable embodiment of a cladding tube according to the invention, the cladding tube is made of plastic. Because of this, the cladding tube can be manufactured easily and with low costs, for example with a suitable mould in an injection moulding process. As mentioned, a suitable plastic is for example a polyethene (PE).

The invention can furthermore be embodied in an assembly, comprising an underwater conduit and at least one cladding tube according to any one of the preceding claims, which cladding tube in its operation condition is installed around said underwater conduit. Therein, at least one tensioning strap can be tensioned around the cladding tube in circumferential direction of the cladding tube.

In the following, the invention is further elucidated with reference to some non-limiting embodiments and with reference to the schematic figures in the attached drawing.

FIG. 5 shows, in another perspective view, a situation in which, starting off from the situation of FIG. 4, a fourth shell part, which also is identical to the first shell part, together with the third shell part can form a second specimen of a cladding tube according to the invention in its assembled condition, wherein:

the abovementioned spigot-and-socket joint is effectuated between the male part of the first specimen of the cladding tube and the female part of the second specimen of the cladding tube;

the first specimen and the second specimen are in their operation conditions, in which they are enveloping an underwater conduit;

the underwater conduit makes a gentle bend; and the first specimen and the second specimen are following the gentle bend of the underwater conduit by corresponding buckling positions of their peripheral buckling portions.

FIG. 7 shows the situation of FIG. 3 in a transverse cross-section according to the plane, which in FIG. 3 is indicated by arrows VII, which plane:

is perpendicular to the longitudinal direction of the first specimen of the cladding tube; and is extending through a first clamping portion of the first specimen, which first clamping portion is of a kind as of the abovementioned at least one clamping portion.

A number of the reference signs used in FIGS. 1-8 are referring to the abovementioned parts and aspects of the invention in the following manner.

Figure 5:
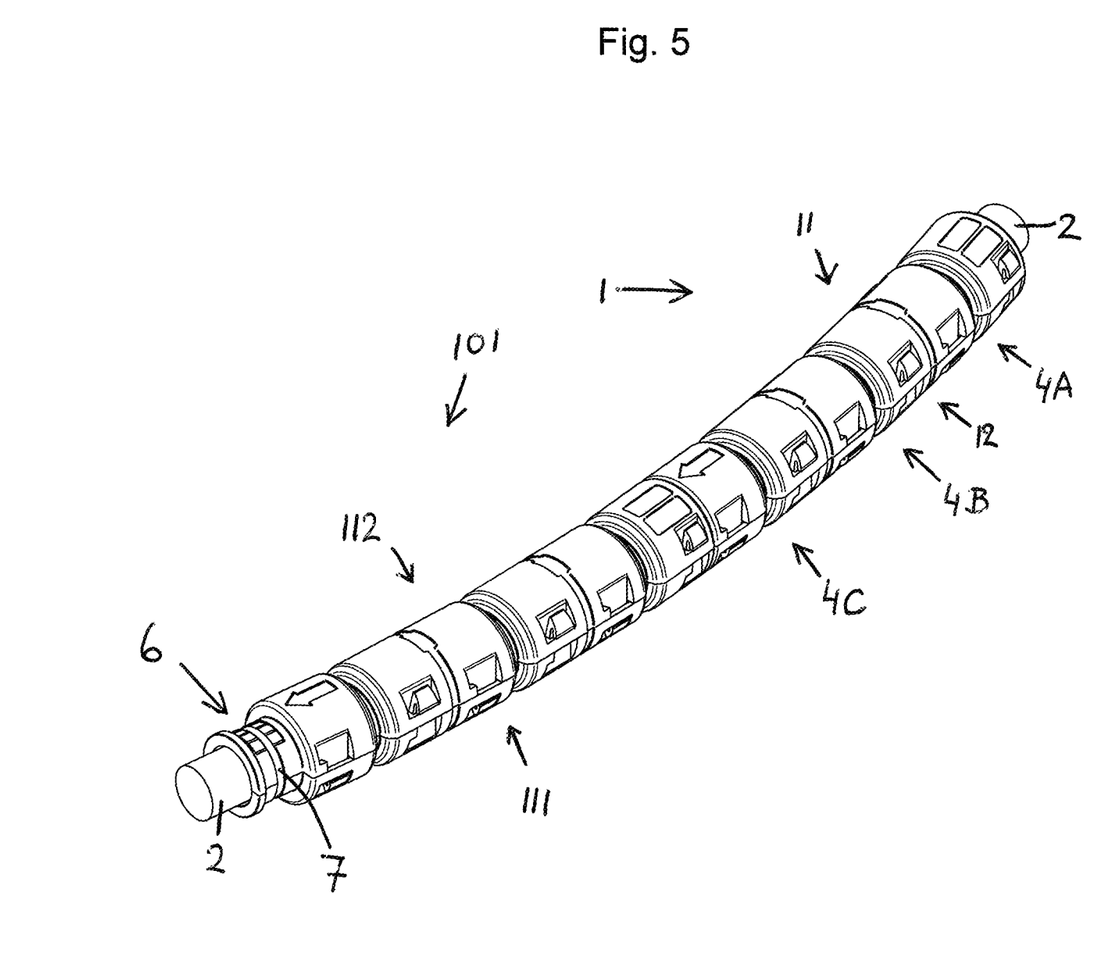
Figure 6:
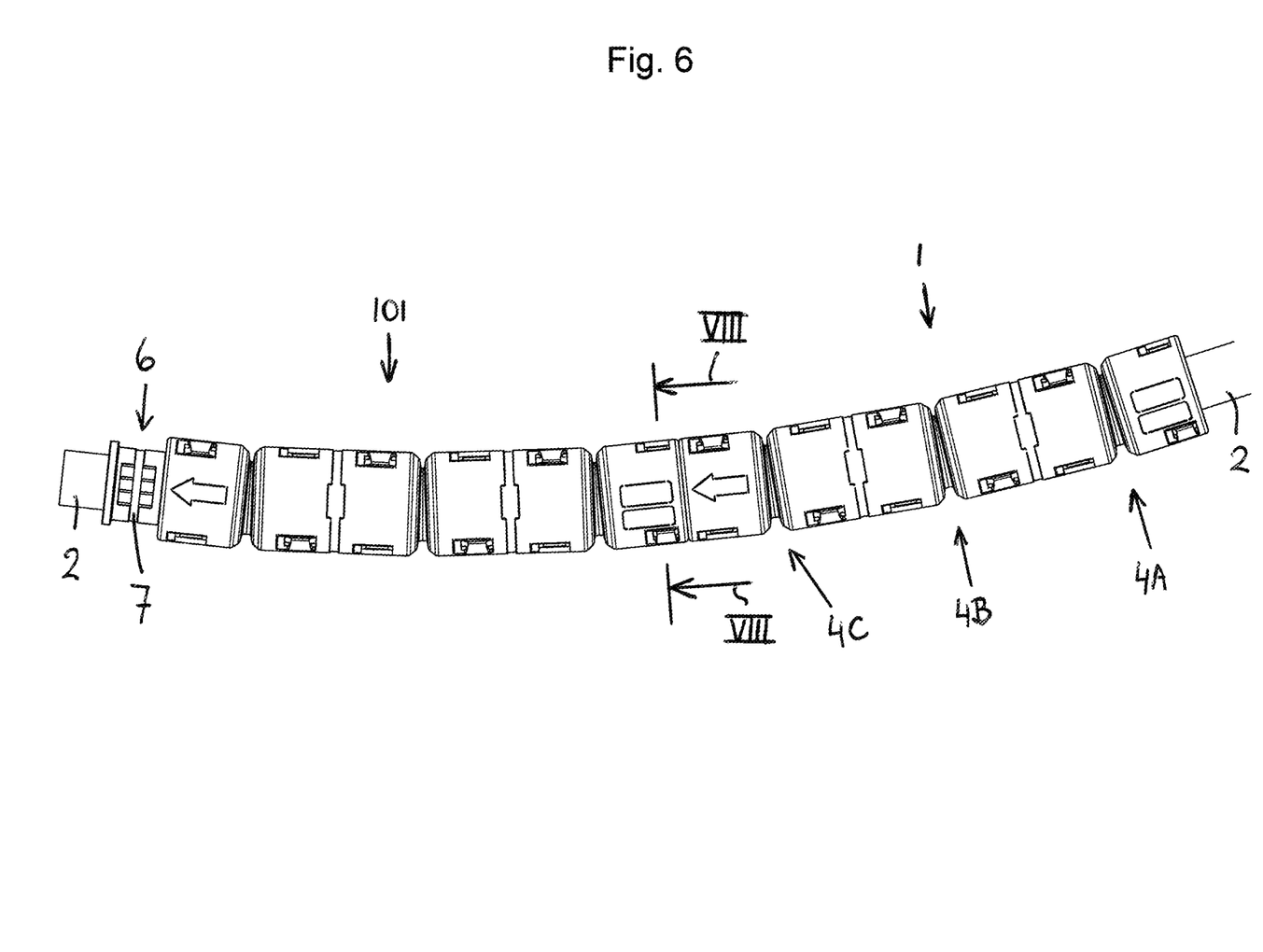
FIG. 6 shows the situation of FIG. 5 in a side view.
Figure 7:
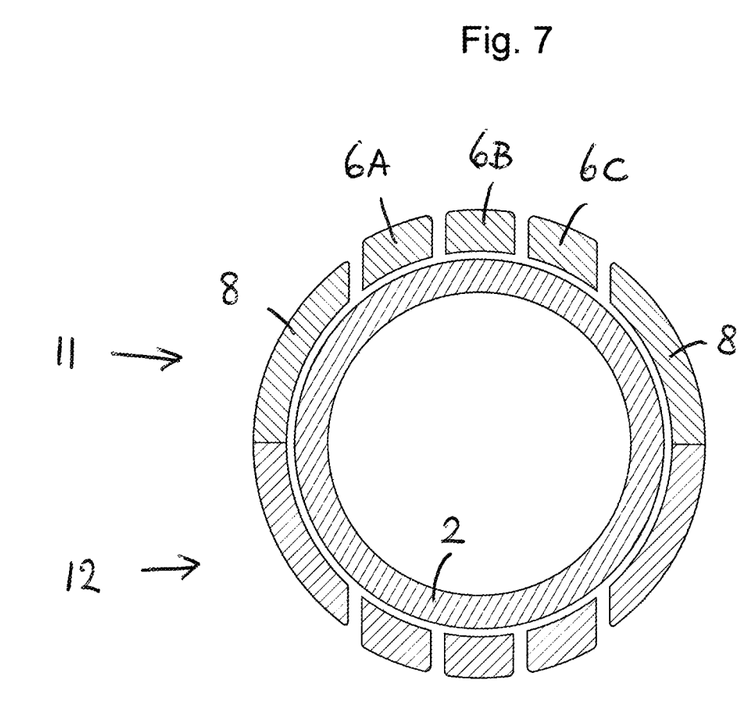

1, 101 cladding tube
L longitudinal direction of the cladding tube
R radial direction of the cladding tube
C circumferential direction of the cladding tube
2 underwater conduit
3A, 3B, 3C buckling subrange (see FIG. 3)
4A, 4B, 4C peripheral buckling portion
5 clamping subrange (see FIG. 3)
6 clamping portion
6A, 6B, 6C deformation portion
7 tensioning strap
8 second wall part
9 male part (see FIG. 3)
10 female part (see FIG. 3)
11 first shell part
12 second shell part
111 third shell part
112 fourth shell part
14 rib structure (see FIG. 2)
15, 16 snap connection elements In the figures it is seen how, with the four identical shell parts 11, 12, 111, 112, the two identical cladding tubes 1 and 101 are formed. In the shown example, each of both cladding tubes is rotational symmetrical in the sense of a rotation of the complete cladding tube about the longitudinal direction L by an angle of rotation of 180 degrees. In the shown example each of both cladding tubes has three of the said peripheral buckling portions, which for cladding tube 1 are indicated by 4A, 4B, 4C. Each peripheral buckling portion 4A, 4B, 4C is formed as the abovementioned peripheral folding pleat, of which the buckling action is seen in FIGS. 5 and 6.

Figure 3:
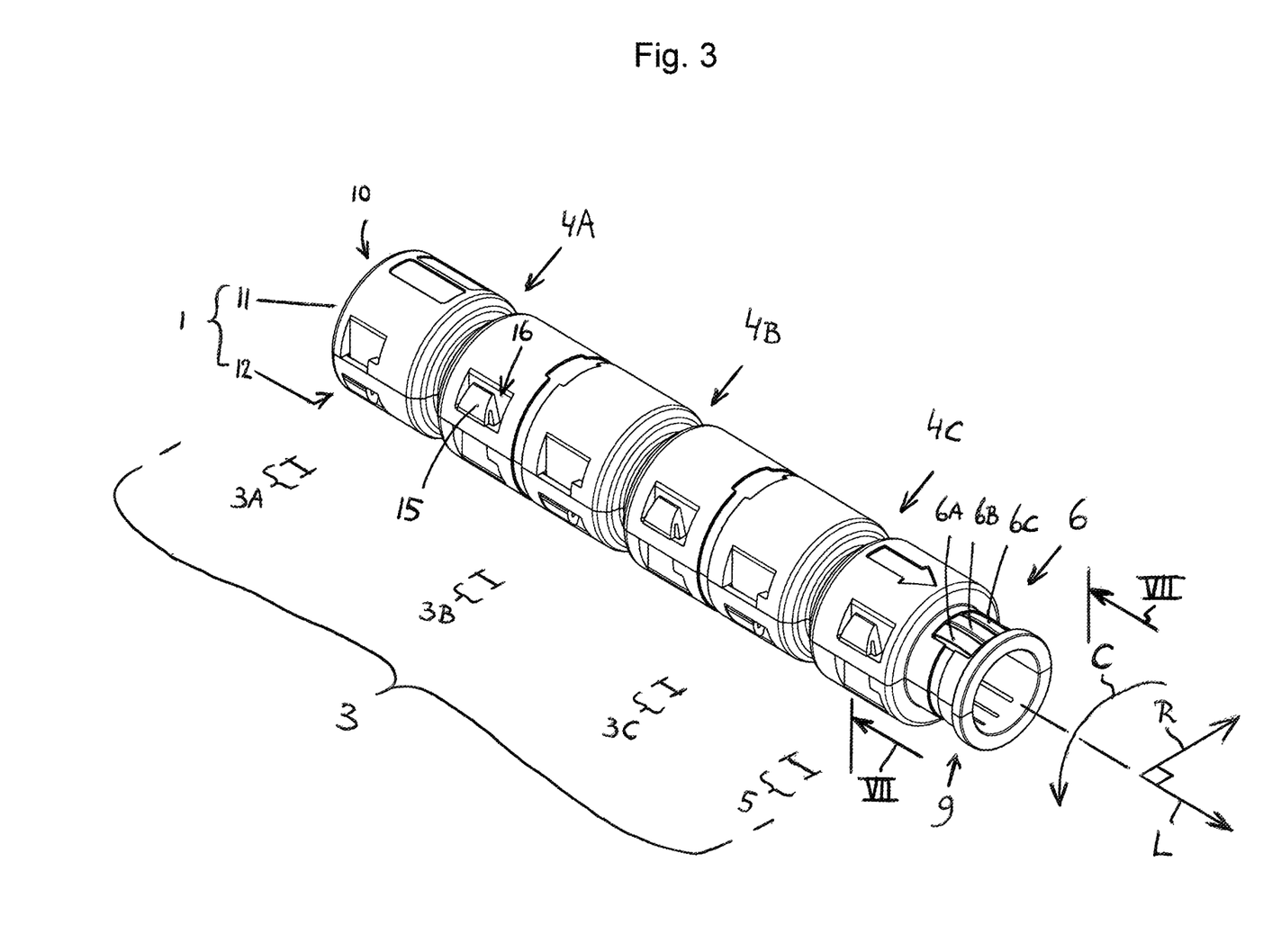
FIG. 3 shows, again in said perspective view, how the first shell part and the second shell part in their respective orientations of FIGS. 1 and 2 can be mutually assembled in such manner, that a first specimen of a cladding tube according to the invention is formed in its assembled condition.
Figure 4:
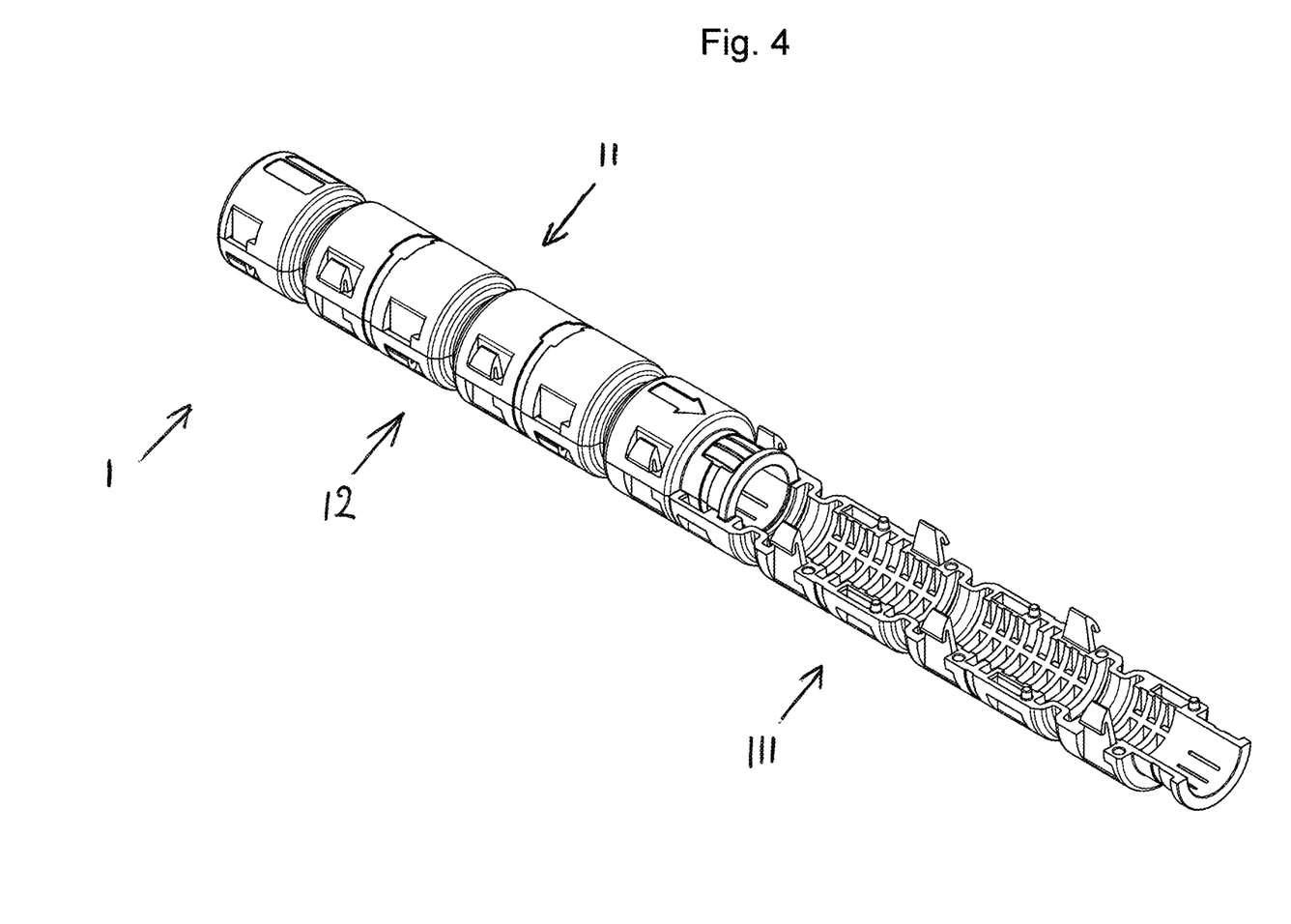
FIG. 4 shows, again in said perspective view, how a third shell part, which also is identical to the first shell part, can be coupled to an end of the first specimen, shown in FIG. 3, of the cladding tube.
Figure 8:
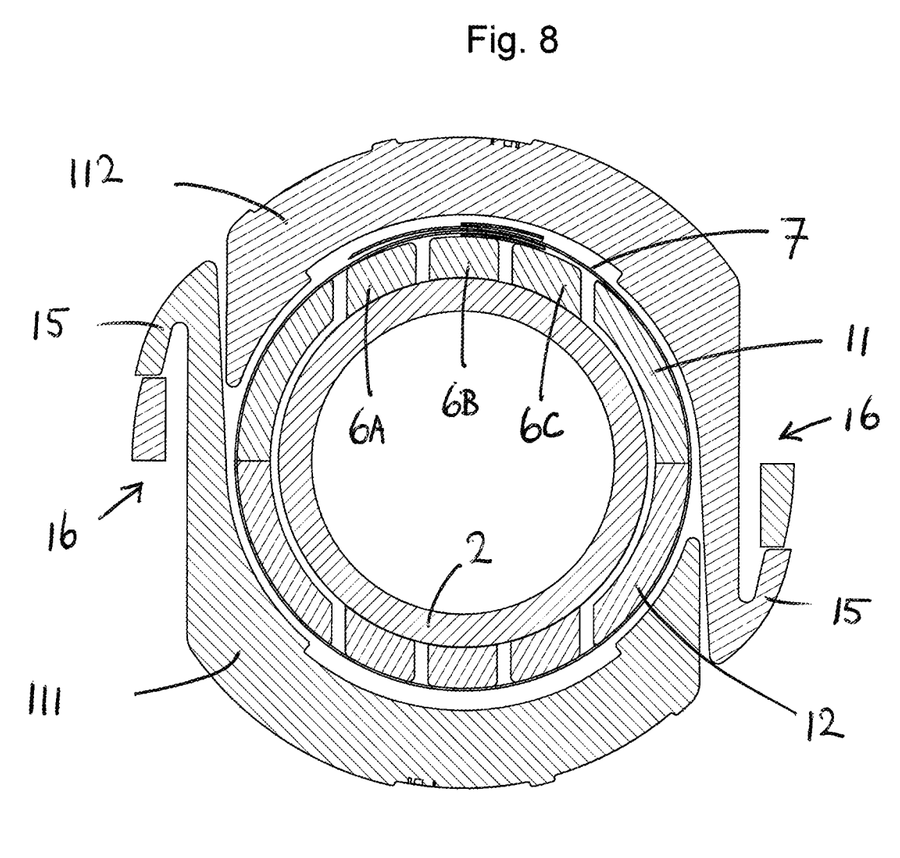
FIG. 8 shows the same cross-section as that of FIG. 7, however, this time in the situation of FIGS. 5 and 6, that is to say in a transverse cross-section according to the plane indicated in FIG. 6 by arrows VIII, and with the difference that in FIGS. 5, 6 and 8 a tensioning strap is tensioned around the clamping portion of the first specimen.

In FIG. 3 the male part and the female part of the cladding tube 1 are indicated by the reference numerals 9 and 10, respectively. In FIGS. 5, 6, 8 a spigot-and-socket joint has been effectuated between the male part of cladding tube 1 and the female part of cladding tube 101.

Figure 1:
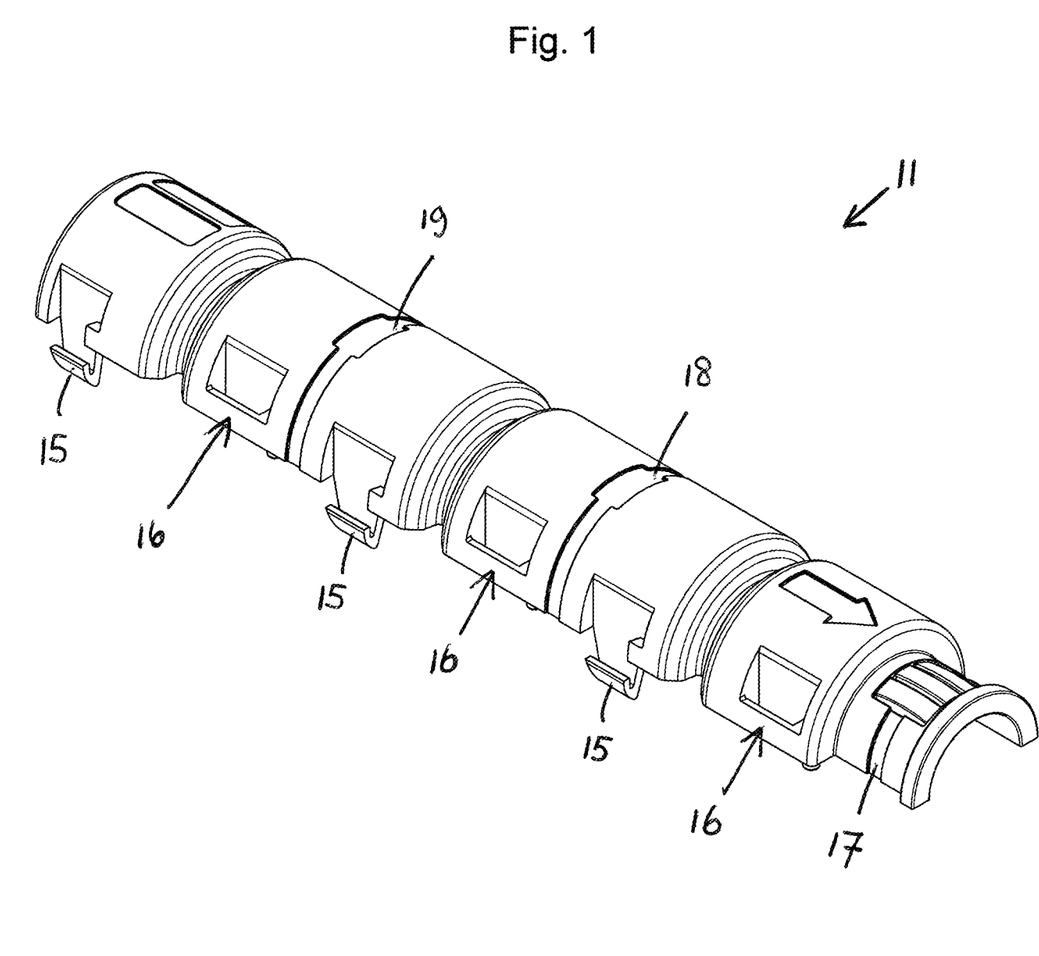
FIG. 1 shows, in a perspective view, an example of an embodiment of a cladding element, being designed as a first shell part, for releasable application in an example of an embodiment of a cladding tube according to the invention.
Figure 2:
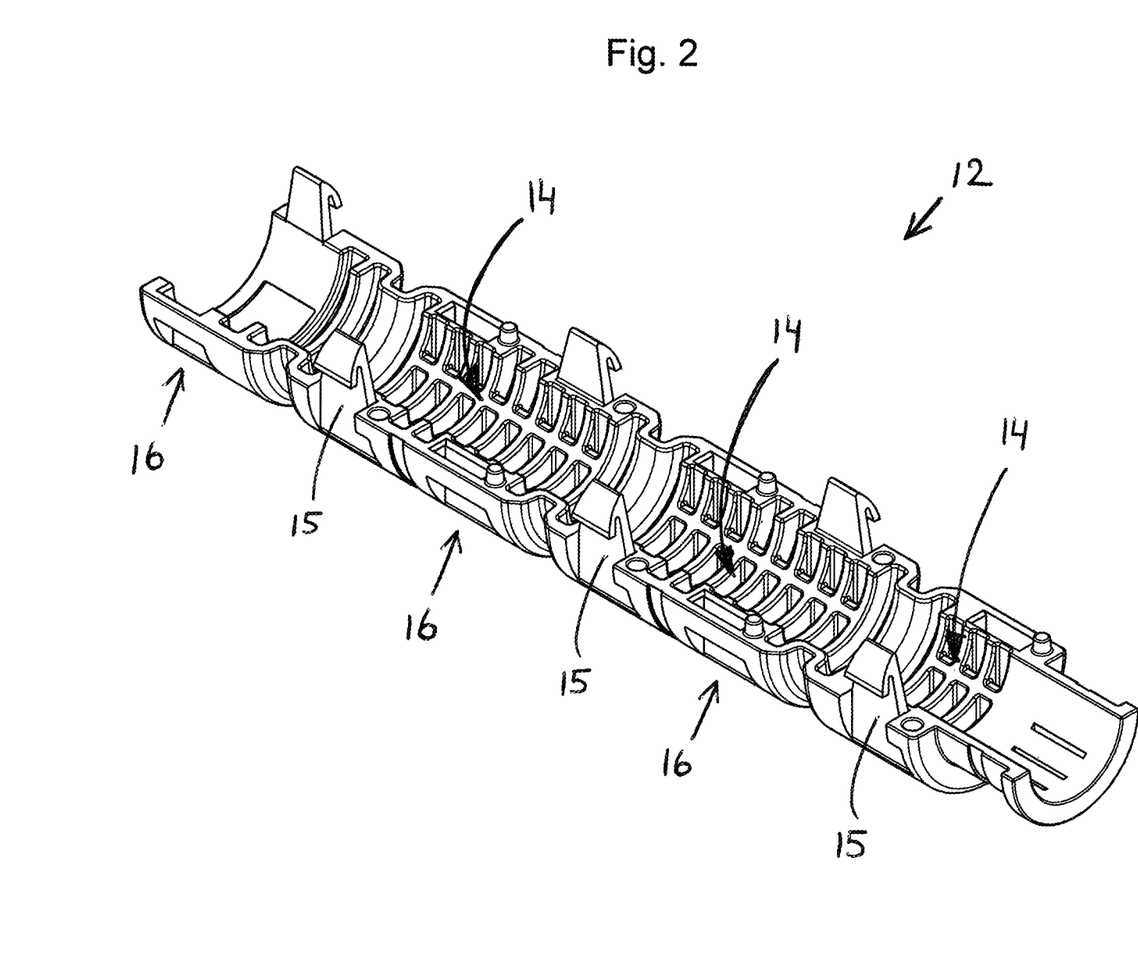
FIG. 2 shows, in said perspective view, a second shell part which is identical to the first shell part, wherein the second shell part is in an upside-down orientation relative to the first shell part.

In FIG. 1 there is shown a groove 17 of the first shell part 11. The groove 17 of course is also present in the second shell part 12 shown in FIG. 2, since the second shell part 12 is identical to the first shell part 11. In the two interconnected grooves 17 of the two shell parts 11 and 12, there has been mounted a tensioned tensioning strap 7 in FIGS. 5, 6, 8. Hence, at that location this tensioning strap 7 is extending in the circumferential direction C around the male part 9 of the cladding tube 1. In addition, at that location the tensioning strap 7 is enveloped, in the circumferential direction C, by the female part 10 of the cladding tube 101. Accordingly, the tensioning strap 7, and its tensioning mechanism, is protected against collisions by the cladding tube 101, which is formed by the shell parts 111 and 112. This protection of the tensioning strap 7 by the shell parts 111 and 112 is clearly seen in FIG. 8. Not only the tensioning strap 7, but also the complete clamping portion 6 is protected against collisions by the female part 10 of the spigot-and-socket joint.

It is remarked that in the shown example there are optionally provided additional grooves 18 and 19 (see FIG. 1). Optionally, if desired for additional safety, yet additional tensioning straps could be mounted in these additional grooves 18 and 19. In many cases, however, one can without worries dispense with such additional tensioning straps, since the mutually co-operating snap connection elements 15, 16 (see FIGS. 1, 2) enable a firm mutual attachment of the two shell parts 11 and 12.

In this respect it is also remarked that the tensioning strap 7 does not have in the first place the function to mutually attach the two shell parts 11 and 12. After all, in the shown example the tensioning strap 7 has as main function to locally clamp the cladding tube 1 against the underwater conduit 2. For, in the clamping subrange 5 the clamping portion 6 of the cladding tube 1 comprises the shown, integrally manufactured local deformation portions 6A, 6B, 6C. These portions 6A, 6B, 6C are having larger thicknesses in the radial direction R than the second wall parts 8 (see FIG. 7) of the clamping portion 6 at the location of the two grooves 17. In FIG. 8 it is seen that, partly as a result of said larger thicknesses in the radial direction R, the deformation portions 6A, 6B, 6C are, and the second wall portions 8 are not, pressed against the underwater conduit 2 by the tensioned tensioning strap 7.

It is remarked that the abovementioned examples of embodiments of the invention do not limit the invention, and that various alternatives are possible within the scope of the appended claims.

For example, in the shown example a plurality of mutually releasable cladding elements have been applied, which are mutually interconnected in the circumferential direction of the assembled cladding tube. However, instead of mutually releasable cladding elements, the cladding tube can also be designed as a construction which can be rolled-up in the circumferential direction (for example a mat, or the like), in which construction parts can be distinguished, which are similarly shaped as the discussed releasable cladding elements. Such similarly shaped construction parts may then for example be integrally manufactured with one another and may for example be hingeably interconnected with one another for the purpose of rolling-up the construction in the circumferential direction.

However, other variations or modifications are also possible. These and similar alternatives are deemed to fall within the scope of the invention as defined in the appended claims.

The invention claimed is:

1. A cladding tube for enveloping an underwater conduit, wherein the cladding tube has an operation condition, in which the cladding tube is installed around said underwater conduit, wherein the cladding tube over at least one clamping subrange of its overall-range in its longitudinal direction is formed as at least one clamping portion, respectively, of the cladding tube, wherein said clamping portion comprises at least one local deformation portion, which is integrally manufactured with the cladding tube, and which can deform, relative to other portions of said clamping portion, said other portions lying circumferentially adjacent to the local deformation portion, under influence of a tensioning strap being tensioned externally around the cladding tube, in circumferential direction of the cladding tube, in such manner that said tensioned tensioning strap presses the at least one local deformation portion in said operation condition of the cladding tube with at least a component in radial direction of the cladding tube against the underwater conduit, whereby the cladding tube is locally clamped against the underwater conduit by the at least one local deformation portion, wherein at least one of the at least one local deformation portion of at least one of the at least one clamping portion is a first wall portion of the cladding tube, and wherein said other portions of said clamping portion comprise at least one second wall portion lying circumferentially adjacent to said first wall portion, wherein each of said first wall portion and said second wall portion is extending from an inner surface of the cladding tube to an outer surface of the cladding tube, said first wall portion and said second wall portion having a first thickness and a second thickness, respectively, as measured in the radial direction from said inner surface to said outer surface, wherein said first thickness is larger than said second thickness, in such manner that as a result of said first thickness being larger than said second thickness the first wall portion is, and the at least one second wall portion is not, pressed against the underwater conduit by said tensioned tensioning strap and wherein the cladding tube over at least one buckling subrange of its overall-range in its longitudinal direction is formed as at least one peripheral buckling portion, respectively, of the cladding tube, wherein said peripheral buckling portion is extending all round in circumferential direction of the cladding tube, and wherein said peripheral buckling portion can buckle in such manner that, as seen in said operation condition, the cladding tube follows a bending course of said underwater conduit, wherein said bending course is occurring in arbitrary directions within said overall-range, by at least one corresponding buckling position of the at least one peripheral buckling portion, respectively.

2. The cladding tube according to claim 1, wherein the cladding tube has two ends lying mutually opposite in the longitudinal direction of the cladding tube, and wherein the two ends are embodied as a male part and a female part, respectively, of a spigot-and-socket joint which can be effectuated between the male part of a first specimen of the cladding tube and the female part of a second specimen of the cladding tube.

3. The cladding tube according to claim 2, wherein at least one of the at least one clamping portion is part of said male part in such manner that the clamping portion concerned, in case said spigot-and-socket joint is effectuated, in the circumferential direction of the cladding tube is enveloped by said female part of the spigot-and-socket joint.

4. The cladding tube according to claim 1, wherein at least one of the at least one peripheral buckling portion is formed as at least one peripheral folding pleat, respectively, which is extending all round in circumferential direction of the cladding tube.

5. The cladding tube according to claim 1, wherein the cladding tube has an inner side, which in said operation condition is facing towards the underwater conduit, and wherein outside of the at least one buckling subrange of the longitudinal direction of the cladding tube, the inner side is provided with a rib structure.

6. The cladding tube according to claim 1, wherein the cladding tube comprises a plurality of mutually releasable cladding elements, and wherein said operation condition of the cladding tube requires an assembled condition of said cladding elements, wherein in said assembled condition the cladding elements are connected to one another in the circumferential direction of the cladding tube.

7. The cladding tube according to claim 6, wherein the mutually releasable cladding elements are comprising mutually co-operating snap connection elements, respectively, for bringing and maintaining said cladding elements into said assembled condition by snap connection.

8. The cladding tube according to claim 6, wherein the mutually releasable cladding elements are mutually identical.

9. The cladding tube according to claim 8, wherein the cladding tube is rotational symmetrical in the sense of a rotation of the complete cladding tube about the longitudinal direction of the cladding tube by an angle of rotation, which is equal to 360 degrees divided by the total number of the mutually identical cladding elements of the cladding tube.

10. The cladding tube according to claim 1, wherein the cladding tube is made of plastic.

11. An assembly, comprising an underwater conduit and at least one cladding tube according to claim 1, wherein the cladding tube in its operation condition is installed around said underwater conduit.

12. The assembly according to claim 11, wherein at least one tensioning strap is tensioned around the cladding tube in circumferential direction of the cladding tube.

13. The cladding tube of claim 1, the tensioning strap being tensioned externally around the clamping portion.

14. A cladding tube for enveloping an underwater conduit, wherein the cladding tube has an operation condition, in which the cladding tube is installed around said underwater conduit, wherein the cladding tube over at least one clamping subrange of its overall-range in its longitudinal direction is formed as at least one clamping portion, respectively, of the cladding tube, wherein said clamping portion comprises at least one local deformation portion, which is integrally manufactured with the cladding tube, and which can deform, relative to other portions of said clamping portion, said other portions lying circumferentially adjacent to the local deformation portion, under influence of a tensioning strap being tensioned externally around the cladding tube, in circumferential direction of the cladding tube, in such manner that said tensioned tensioning strap presses the at least one local deformation portion in said operation condition of the cladding tube with at least a component in radial direction of the cladding tube against the underwater conduit, whereby the cladding tube is locally clamped against the underwater conduit by the at least one local deformation portion, wherein at least one of the at least one local deformation portion of at least one of the at least one clamping portion is a first wall portion of the cladding tube, and wherein said other portions of said clamping portion comprise at least one second wall portion lying circumferentially adjacent to said first wall portion, wherein each of said first wall portion and said second wall portion is extending from an inner surface of the cladding tube to an outer surface of the cladding tube, said first wall portion and said second wall portion having a first thickness and a second thickness, respectively, as measured in the radial direction from said inner surface to said outer surface, wherein said first thickness is larger than said second thickness, in such manner that as a result of said first thickness being larger than said second thickness the first wall portion is, and the at least one second wall portion is not, pressed against the underwater conduit by said tensioned tensioning strap; and wherein the cladding tube comprises a plurality of mutually releasable cladding elements, and wherein said operation condition of the cladding tube requires an assembled condition of said cladding elements, wherein in said assembled condition the cladding elements are connected to one another in the circumferential direction of the cladding tube; and wherein the mutually releasable cladding elements are comprising mutually co-operating snap connection elements, respectively, for bringing and maintaining said cladding elements into said assembled condition by snap connection.

15. The cladding tube according to claim 14, wherein the cladding tube has two ends lying mutually opposite in the longitudinal direction of the cladding tube, and wherein the two ends are embodied as a male part and a female part, respectively, of a spigot-and-socket joint which can be effectuated between the male part of a first specimen of the cladding tube and the female part of a second specimen of the cladding tube.

16. The cladding tube according to claim 15, wherein at least one of the at least one clamping portion is part of said male part in such manner that the clamping portion concerned, in case said spigot-and-socket joint is effectuated, in the circumferential direction of the cladding tube is enveloped by said female part of the spigot-and-socket joint.

17. The cladding tube according to claim 14, wherein the cladding tube over at least one buckling subrange of its overall-range in its longitudinal direction is formed as at least one peripheral buckling portion, respectively, of the cladding tube, wherein said peripheral buckling portion is extending all round in circumferential direction of the cladding tube, and wherein said peripheral buckling portion can buckle in such manner that, as seen in said operation condition, the cladding tube follows a bending course of said underwater conduit, wherein said bending course is occurring in arbitrary directions within said overall-range, by at least one corresponding buckling position of the at least one peripheral buckling portion, respectively.

18. The cladding tube according to claim 17, wherein at least one of the at least one peripheral buckling portion is formed as at least one peripheral folding pleat, respectively, which is extending all round in circumferential direction of the cladding tube.

19. The cladding tube according to claim 17, wherein the cladding tube has an inner side, which in said operation condition is facing towards the underwater conduit, and wherein outside of the at least one buckling subrange of the longitudinal direction of the cladding tube, the inner side is provided with a rib structure.

20. The cladding tube according to claim 14, wherein the mutually releasable cladding elements are mutually identical.

21. The cladding tube according to claim 20, wherein the cladding tube is rotational symmetrical in the sense of a rotation of the complete cladding tube about the longitudinal direction of the cladding tube by an angle of rotation, which is equal to 360 degrees divided by the total number of the mutually identical cladding elements of the cladding tube.

22. The cladding tube according to claim 14, wherein the cladding tube is made of plastic.

23. An assembly, comprising an underwater conduit and at least one cladding tube according to claim 14, wherein the cladding tube in its operation condition is installed around said underwater conduit.

24. The assembly according to claim 23, wherein at least one tensioning strap is tensioned around the cladding tube in circumferential direction of the cladding tube.

25. The cladding tube of claim 14, the tensioning strap being tensioned externally around the clamping portion.

26. An assembly comprising a first cladding tube and a second cladding tube for enveloping a conduit, wherein:
  each of said first cladding tube and said second cladding tube comprises:
    two ends lying mutually opposite in the longitudinal direction of the cladding tube, the two ends being embodied as a male part and a female part, respectively;
    a clamping portion being part of said male part, the clamping portion comprising a first wall portion positioned adjacent to and circumferentially between second wall portions; and
    a tensioning strap on an external surface of the clamping portion, wherein a thickness of the first wall portion in a radial direction is greater than a thickness of the second wall portion in the radial direction, such that when tension is applied to the tensioning strap in a circumferential direction, the first wall portion is configured to contact the conduit and the second wall portion is configured to not contact the conduit,
  a spigot-and-socket joint is effectuated between the male part of said first cladding tube and the female part of said second cladding tube, and
  the clamping portion and the tensioning strap of said first cladding tube in the circumferential direction of the cladding tube are enveloped by said female part of said second cladding tube.

* * * * *